United States Patent
Nishimura et al.

[15] 3,692,902
[45] Sept. 19, 1972

[54] CERTAIN PHOSPHOROUS COMPOUNDS USED AS INSECTICIDES, MITICIDES AND FUNGICIDES

[72] Inventors: Tatsumi Nishimura; Sumio Nagasawa; Hiroshi Shinohara, all of Shimizu City; Masaru Kado, Yokohama City, all of Japan

[73] Assignee: Kumiai Chemical Industry Co., Ltd., Tokyo, Japan

[22] Filed: Oct. 14, 1969

[21] Appl. No.: 866,381

[30] Foreign Application Priority Data
Dec. 19, 1966 Japan..................41/82,689
July 31, 1967 Japan..................43/48,778

Related U.S. Application Data

[63] Continuation-in-part of Ser. No. 680,970, Nov. 6, 1967, abandoned.

[52] U.S. Cl..................424/212, 260/941
[51] Int. Cl. ...............................A01n 9/36
[58] Field of Search ............424/212; 260/941

[56] References Cited

UNITED STATES PATENTS

2,815,312   12/1957   Schuler..................424/212
3,228,999   1/1966   Schicke..................260/940

*Primary Examiner*—Albert T. Meyers
*Assistant Examiner*—Leonard Schenkman
*Attorney*—Stevens, Davis, Miller & Mosher

[57] ABSTRACT

An insecticidal, miticidal and fungicidal composition comprising as an active ingredient an insecticidally, miticidally and fungicidally effective amount of a compound of the formula:

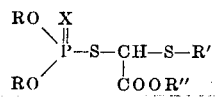

in which R and R'' are lower alkyl, R'' is selected from the group consisting of phenyl, lower alkyl-substituted phenyl, chlorine-substituted phenyl and nitro substituted phenyl, and X is selected from the group consisting of oxygen and sulfur, in the presence of an inert diluent.

12 Claims, No Drawings

CERTAIN PHOSPHOROUS COMPOUNDS USED AS INSECTICIDES, MITICIDES AND FUNGICIDES

This application is a continuation-in-part of our copending application, Ser. No. 680,970 filed Nov. 6, 1967 now abandoned.

The present invention relates to compositions for preventing harmful organisms of fungi, mites and insects comprising as active ingredient novel organic phosphates having the general formula

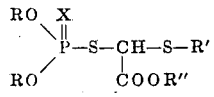

, wherein R and R'' represent lower alkyl groups, R' represents a group selected from the class consisting of phenyl, lower alkyl-substituted phenyl, chlorine-substituted phenyl, nitro substituted phenyl and X represents an atom selected from the group consisting of oxygen and sulfur, and a method of using these compositions.

It is known that alkyl-dialkoxyphosphinylthio-alkylthioacetates are used as compositions for combating insect pests and their manufacture is disclosed in U.S. Pat. No. 2,815,312. It has now been found that the phosphorus compounds according to the present invention show improved insecticidal properties. They distinguish themselves further by a very good acaricidal action in residual effectiveness and a very good fungicidal action at minimum rates of application.

The active ingredients according to the present invention are novel organophosphorus compounds having a low toxicity against warm blooded animals and show an excellent insecticidal activity against harmful insects for agricultural products.

Moreover, the phosphorus compounds according to the present invention can be used as a fungicide, particularly, a composition for preventing rice blast (*Piricularia Oryzae*) instead of organomercurous compounds previously used.

Furthermore, organophosphorus compounds have been currently used as compositions for preventing rice blast instead of organomercurous fungicides, but this fungicidal activity is developed mainly as therapeutical activity and is poor in preventive activity.

However, the fungicides according to the present invention have considerably excellent activity both in the therapeutical activity and the preventive activity.

Moreover, the compounds used in the present invention have a high toxicity against mites and can be advantageously used as miticides.

The phosphorus compounds of the active ingredients according to the present invention can be produced by the following reaction formula

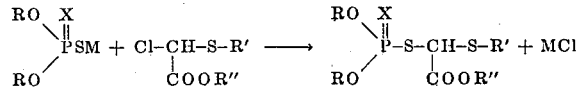

, wherein R, R', R'' and X have the same meanings as described above and M represents a material selected from the group consisting of alkali metals and ammonium.

The active ingredients produced by the above described reaction formula are listed as follows:

1. ethyl-α-(diethoxyphosphinylthio)-α-(phenylthio) acetate
2. ethyl-α-(diethoxyphosphinylthio)-α-(4-chlorophenylthio) acetate
3. ethyl-α-(dimethoxyphosphinylthio)-α-(4-chlorophenylthio) acetate
4. ethyl-α-(diethoxyphosphinylthio)-α-(4-methylphenylthio) acetate
5. ethyl-α-(dimethoxyphosphinylthio)-α-(4-methylphenylthio) acetate
6. n-propyl-α-(dimethoxyphosphinylthio)-α-(phenylthio) acetate
7. ethyl-α-(dimethoxyphosphinothioylthio)-α-(4-chlorophenylthio) acetate
8. ethyl-α-(diethoxyphosphinothioylthio)-α-(4-methylphenylthio) acetate
9. ethyl-α-(diisopropoxyphosphinylthio)-α-(4-chlorophenylthio) acetate
10. ethyl-α-(diisopropoxyphosphinothioylthio)-α-(4-chlorophenylthio) acetate Compounds 1, 2 ... described hereinafter mean the compounds 1, 2 ... disclosed in the above list.

Then, the present invention will be explained with respect to examples for synthesizing the compounds according to the present invention.

EXAMPLE 1

Ethyl-α-(diethoxyphosphinylthio)-α-(Phenythio) Acetate

A solution of 20.8 g (0.1 mole) of potassium O.O-diethylthiolophosphate in 200 ml of acetone was introduced into 300 ml of three-necked flask and added gradually with 23.1 g (0.1 mole) of ethyl-α- chloro-α- (phenylthio) acetate (boiling point of 120° C./mm Hg) dropwise, while stirring thoroughly. After completed the addition, the resulting mixture was heated and circulated for 3 hours.

After the reaction was completed, the precipitated potassium chloride was filtered off and the filtrate was distilled to remove acetone and the residual oil layer was extracted with benzene, and then the extract was washed with water and dried with anhydrous Glauber's salt. Benzene was distilled off and the residue was subjected to a high vacuum distillation to obtain 27.5 g of a fraction having a boiling point of 125° to 130° C./0.01 to 0.02 mm Hg, which was yellow clear liquid. Yield: 75.6 percent. Refractive index: $N_D^{25} = 1.5330$.

Elementary analysis: Found, P = 8.38%, Calculated, P = 8.48%.

I.R. Absorption band shows phenyl: 3,060 cm$^{-1}$ (W), 1,580 cm$^{-1}$, 1,475 cm$^{-1}$ (M), C$_2$H$_5$: 2,980–2,985 cm$^{-1}$, 1,440 cm$^{-1}$, > CO: 1,745 cm$^{-1}$, PO: 1,255 cm$^{-1}$, (C$_2$H$_5$O)$_2$P: 1,015 – 970 cm$^{-1}$.

Compound Nos. 2 to 49 were produced in the same manner as described above.

Furthermore, the compounds having the general formula, which are the starting material for the above synthesis, can be produced by the following reaction formula:

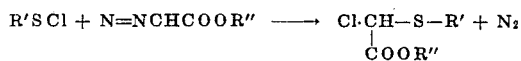

The phosphoric acid esters according to the present invention are mixed with a diluent involving carriers and surfactants to prepare dusts, emulsifiable concentrates, wettable powders, which can be used directly or after diluted with water.

The term "carrier" used herein means vehicles to be used for carrying the active component to a desired area, which may be both solid and liquid.

For example, as solid carriers use may be made of various clays, talc, kaolin, diatomaceous earth, calcium carbonate, white carbon and saw dust. As liquid carriers, use may be made of solvents for the active components and non-solvents which can disperse or dissolve the active component by means of an auxiliary agent, for example, water, benzene, kerosine, alcohols, acetones, methylnaphthalene, xylene.

The term "surfactant" used herein involves nonionic sufactants, such as polyoxyethylenesorbitan monolaurate, etc., cationic surfactants, such as alkyldimethylbenzylammonium chloride, alkylpyridinium halide, etc., anionic surfactants, such as alkylbenzenesulfonate, higher fatty alcohol sulfate, etc., amphoteric surfactants, such as lauryl amine derivatives, betaine derivatives, dodecyldiaminoethyl glycine, etc.

The invention will be explained further with respect to some preparation examples, but the diluents, the mixture ratios and the active components can be varied in a wide range. The percent means by weight.

EXAMPLE 2

Dust

Two % of ethyl-α-(dimethoxyphosphinylthio)-α-(4-chlorophenylthio) acetate, 5 percent of diatomaceous earth, 50 percent of kaolin and 43 percent of talc were mixed and pulverized, and the resulting powder was dusted.

EXAMPLE 3

Wettable Powder

Twenty percent of ethyl-α-(dimethoxyphosphinothioylthio)-α-(4-chlorophenylthio) acetate, 20 percent of diatomaceous earth, 55 percent of kaolin and 5 percent of a mixture of polyoxyethylene alkylphenyl ether, polyoxyethylene phenylphenol ether and polyoxyethylene carboxylate, which is a spreading agent, were mixed and pulverized to form a wettable powder, which was used as an emulsion in water.

EXAMPLE 4

Emulsifiable Concentrate

Twenty percent of ethyl-α-(diethoxyphosphinylthio)-α-(phenylthio) acetate, 60 percent of xylene, 20 percent of a mixture of polyoxyethylene alkylphenyl ether, polyoxyethylene phenylphenol ether and polyoxyethylene carboxylate, which is an emulsifier, were mixed and dissolved to obtain an emulsifiable concentrate, which was used after diluted with water.

EXAMPLE 5

Dust

Two percent of ethyl-α-(diethoxyphosphinylthio)-α-(phenylthio) acetate, 5 percent of diatomaceous earth, 50 percent of kaolin and 43 percent of talc were mixed and pulverized to form a dust, which was dusted.

EXAMPLE 6

Wettable Powder

Twenty percent of ethyl-α-(diethoxyphosphinylthio)-α-(4-chlorophenylthio) acetate, 20 percent of diatomaceous earth, 55 percent of kaolin and 5 percent of a mixture of polyoxyethylene alkylphenyl ether, polyoxyethylene phenylphenol ether and polyoxyethylene carboxylate, which is a spreading agent, were mixed and pulverized to form a wettable powder, which was used as a suspension in water.

EXAMPLE 7

Emulsifiable Concentrate

Twenty percent of ethyl-α-(dimethoxyphosphinothioylthio)-α-(4-chlorophenylthio) acetate, 60 percent of xylene and 20 percent of a mixture of polyoxyethylene alkylphenyl ether, polyoxyethylene phenylphenol ether and polyoxyethylene carboxylate, which is an emulsifier, were mixed and dissolved to form an emulsifiable concentrate, which was used after diluted with water.

Then Experimental Examples for preventing disease and insect pests by means of the active compounds according to the present invention will be explained.

Experimental Example 1
  Test for controlling *Panonychus ulmi* Koch
  Active ingredient:Compounds are shown in the following Table 1.
  Concentration:1,000 ppm in phosphorus series compounds; 175 ppm in the comparative compound made by Nippon Soda Kabushiki Kaisha under the trademark "Nisol," which was prepared by diluting 35 percent of wettable powder of this compound to 2,000 times.
  Test method:A branch of an apple tree (length 25 cm, number of leaves; 5–6) infested with the adults of *Panonychus ulmi* Koch was cut and put into a glass bottle. Each 20 cc of an aqueous dispersion of the compound to be tested, which was adjusted to the predetermined concentration, was spread on the branch by means of a glass nozzle. Two days after spread, the mortality was determined to obtain the results as shown in the following Table 1.

TABLE 1

| Active ingredient | Insecticidal activity | | |
|---|---|---|---|
| | Number of adults to be tested | Number of living adults | Mortality |
| Compounds in the invention: | | | |
| $(C_2H_5O)_2P(O)-S-CH(COOC_2H_5)-S-C_6H_4-CH_3$ | 27 | 2 | 92.6 |
| $(C_2H_5O)_2P(S)-S-CH(COOC_2H_5)-S-C_6H_4-CH_3$ | 90 | 0 | 100.0 |
| $(CH_3O)_2P(S)-S-CH(COOC_2H_5)-S-C_6H_4-CH_3$ | 69 | 0 | 100.0 |
| $(CH_3O)_2P(O)-S-CH(COOC_2H_5)-S-C_6H_4-NO_2$ | 67 | 4 | 94.0 |
| Comparative compounds: | | | |
| $(CH_3O)_2P(O)-S-CH(COOC_2H_5)-S-CH_2-C_6H_5$ | 121 | 121 | 0.0 |
| $(CH_3O)_2P(S)-S-CH(COOC_2H_5)-S-CH_2-C_6H_5$ | 119 | 98 | 19.3 |
| $(CH_3O)_2P(S)-S-CH(COOC_2H_5)-S-CH_2-C_6H_4-Cl$ | 61 | 10 | 83.6 |
| $FCH_2C(O)N(CH_3)(naphthyl)$ (Nisol) | 64 | 0 | 100.0 |
| Non-treated | 42 | 39 | 7.2 |

Experimental Example 2

Test for controlling *Panonychus ulmi* Koch

Active ingredient: Compounds are shown in the following Table 2.

Concentration: 1,000 ppm in phosphorus series compounds; 175 ppm in the comparative compound made by Nippon Soda Kabushiki Kaisha under the trademark "Nisol," which was prepared by diluting 35 percent of wettable powder of this compound to 2,000 times.

Test method: A branch of an apple tree (length 20 cm, number of leaves; 4–5) infested with the adults of *Panonychus ulmi* Koch was cut and put into a glass bottle. Each 15 cc of an aqueous dispersion of the compound to be tested which was adjusted to the predetermined concentration, was spread on the branch by means of a glass nozzle. Three days after spread, the mortality was determined to obtain the results as shown in the following Table 2.

TABLE 2

| Active ingredient | Insecticidal activity | | |
|---|---|---|---|
| | Number of adults to be tested | Number of living adults | Mortality |
| Compounds in the invention: | | | |
| $\begin{array}{c}C_2H_5O\\ \phantom{C_2H_5O}\diagdown\\ \phantom{C_2H_5O}P-S-CH-S-\phenyl\\ C_2H_5O\diagup\phantom{P-}\;\;\;\;|\\ \phantom{C_2H_5O-P-S-CH}COOC_2H_5\end{array}$ (O on P) | 35 | 0 | 100.0 |
| $\begin{array}{c}CH_3O\;\;\;O\\ \diagdown\;\|\\ P-S-CH-S-\phenyl\\ CH_3O\diagup\phantom{P-}\;|\\ \phantom{CH_3O-P-S-CH}COOC_2H_5\end{array}$ | 25 | 0 | 100.0 |
| $\begin{array}{c}C_2H_5O\;\;\;O\\ \diagdown\;\|\\ P-S-CH-S-\phenyl-Cl\\ C_2H_5O\diagup\phantom{P-}\;|\\ \phantom{C_2H_5O-P-S-CH}COOC_2H_5\end{array}$ | 51 | 0 | 100.0 |
| $\begin{array}{c}CH_3O\;\;\;S\\ \diagdown\;\|\\ P-S-CH-S-\phenyl-Cl\\ CH_3O\diagup\phantom{P-}\;|\\ \phantom{CH_3O-P-S-CH}COOC_2H_5\end{array}$ | 36 | 0 | 100.0 |
| $\begin{array}{c}CH_3O\;\;\;O\\ \diagdown\;\|\\ P-S-CH-S-\phenyl-Cl\\ CH_3O\diagup\phantom{P-}\;|\\ \phantom{CH_3O-P-S-CH}COOC_2H_5\end{array}$ | 53 | 0 | 100.0 |
| Comparative compounds: | | | |
| $\begin{array}{c}C_2H_5O\;\;\;S\\ \diagdown\;\|\\ P-S-CH-S-CH_2-\phenyl\\ C_2H_5O\diagup\phantom{P-}\;|\\ \phantom{C_2H_5O-P-S-CH}COOC_2H_5\end{array}$ | 40 | 16 | 56.7 |
| Nisol | 34 | 0 | 100.0 |
| Non-treated | 56 | 54 | 3. |

Experimental Example 3

Test for controlling *Panonychus ulmi* Koch
Active ingredient and concentration:
For each of phosphorus series compounds, 10 percent wettable powder was used and diluted with water into each concentration of 500 ppm. For Nisol, 25 percent wettable powder was used and diluted with water to 1,500 times.
Test method:

Adults of *Panonychus ulmi* Koch were inoculated on an apple seedling (annual, number of leaves; 5–9) cultivated in a pot having a diameter of 9 cm and 2 days after the inoculation, an aqueous dispersion of the compound to be tested, which was adjusted to the predetermined concentration, was spread on the seedling by means of a glass nozzle to such an extent that both sides of the leaves were wetted thoroughly.
The results are shown in the following Table 3.

TABLE 3

| Active ingredient | Concentration | Number of insects before spreading | Number of insects after spreading | | |
|---|---|---|---|---|---|
| | | | 1 day | 6 days | 9 days |
| Compound in the invention: | | | | | |
| $\begin{array}{c}C_2H_5O\;\;\;O\\ \diagdown\;\|\\ P-S-CH-S-\phenyl-CH_3\\ C_2H_5O\diagup\phantom{P-}\;|\\ \phantom{C_2H_5O-P-S-CH}COOC_2H_5\end{array}$ | 500 p.p.m. | 34 | 1 | 1 | 0 |

TABLE 3

| Active ingredient | Concentration | Number of insects before spreading | Number of insects after spreading 1 day | 6 days | 9 days |
| --- | --- | --- | --- | --- | --- |
| $(C_2H_5O)_2P(=S)-S-CH(COOC_2H_5)-S-C_6H_4-CH_3$ | 500 p.p.m. | 30 | 0 | 0 | 0 |
| $(CH_3O)_2P(=O)-S-CH(COOC_2H_5)-S-C_6H_4-CH_3$ | 500 p.p.m. | 39 | 0 | 0 | 0 |
| $(CH_3O)_2P(=O)-S-CH(COO-C_3H_4-CH_3)-S-C_6H_5$ | 500 p.p.m. | 30 | 11 | 0 | 1 |
| $(C_2H_5O)_2P(=S)-S-CH(COOC_2H_4-CH_3)-S-C_6H_4-Cl$ | 500 p.p.m. | 35 | 16 | 0 | 0 |
| $(CH_3O)_2P(=O)-S-CH(COOC_2H_4-CH_3)-S-C_6H_4-Cl$ | 500 p.p.m. | 31 | 10 | 0 | 0 |
| Comparative compounds: | | | | | |
| $(C_2H_5O)_2P(=S)-S-CH(COOC_2H_5)-S-C_2H_5$ | 500 p.p.m. | 21 | 16 | 5 | 5 |
| $(CH_3O)_2P(=O)-S-CH(COOC_2H_5)-S-C_2H_5$ | 500 p.p.m. | 21 | 14 | 8 | 8 |
| $(C_2H_5O)_2P(=O)-S-CH(COOC_2H_5)-S-CH_2-C_6H_4-Cl$ | 500 p.p.m. | 33 | 14 | 7 | 7 |
| $(C_2H_5O)_2P(=S)-S-CH(COOC_2H_5)-S-CH_2-C_6H_4-Cl$ | 500 p.p.m. | 30 | 23 | 22 | 18 |
| $(CH_3O)_2P(=O)-S-CH(COOC_2H_5)-S-CH_2-C_6H_4-Cl$ | 500 p.p.m. | 37 | 25 | 21 | 19 |
| $(CH_3O)_2P(=O)-S-CH(COOC_2H_4-CH_3)-S-CH_3$ | 500 p.p.m. | 31 | 25 | 15 | 15 |
| $(C_2H_5O)_2P(=S)-S-CH(COOC_2H_5)-S-CH_3$ | 500 p.p.m. | 33 | 18 | 12 | 7 |
| $(CH_3O)_2P(=S)-S-CH(COOC_2H_5)-S-CH_3$ | 500 p.p.m. | 37 | 11 | 3 | 3 |
| Nisol | 1,500 times | 30 | 0 | 0 | 0 |
| Nisol | do | 32 | 0 | 0 | 0 |

EXPERIMENTAL EXAMPLE 4

Fungicidal activity against rice blast

For rice plants of Aichiasahi variety were grown in each pot having a diameter of 15 cm and the plants were sprayed with each aqueous dispersion prepared by diluting the wettable powder of the compounds shown in the following Table 4 to the concentration as described in Table 4 at the young ears formation period. The pots on a turn table were sprayed by means of pressure sprayer from the side, until the leaves were wetted thoroughly. On the next day, the rice plants were inoculated by means of spraying a spore suspension of *Pyricularia Oryzae* collected from the disease leaves. Treated pots were kept in the moisture chamber of greenhouse. One week after the inoculation, the number of the diseased spots in the upper leaves was determined and the average number of the diseased spots in three pots was calculated per 10 leaves. The result is shown in the following Table 4.

TABLE 4

| Active ingredient | Concentration (p.p.m.) | Number of diseased spots per 10 leaves |
|---|---|---|
| Compound in the invention: | | |
| $(C_2H_5O)_2P(O)-S-CH(COOC_2H_5)-S-C_6H_5$ | 300 | 0 |
| $(CH_3O)_2P(O)-S-CH(COOC_2H_5)-S-C_6H_5$ | 300 | 1 |
| $(CH_3O)_2P(O)-S-CH(COOC_2H_5)-S-C_6H_4-Cl$ | 300 | 5 |
| $(C_2H_5O)_2P(S)-S-CH(COOC_2H_5)-S-C_6H_4-Cl$ | 300 | 3 |
| $(C_2H_5O)_2P(S)-S-CH(COOC_2H_5)-S-C_6H_4-NO_2$ | 300 | 7 |
| $(C_2H_5O)_2P(S)-S-CH(COOC_2H_5)-S-C_6H_4-CH_3$ | 300 | 3 |
| $(isoC_3H_7O)_2P(O)-S-CH(COOC_2H_5)-S-C_6H_4-Cl$ | 300 | 1 |
| Comparative compounds: | | |
| $(CH_3O)_2P(O)-S-CH(COOC_2H_5)-S-CH_3$ | 300 | 85 |
| $(CH_3O)_2P(O)-S-CH(COOC_2H_5)-S-CH(CH_3)_2$ | 300 | 93 |
| $(CH_3O)_2P(S)-S-CH(COOC_2H_5)-S-CH(CH_3)_2$ | 300 | 87 |
| $(CH_3O)_2P(O)-S-CH(COOC_2H_5)-S-C_2H_5$ | 300 | 96 |
| $(C_2H_5O)_2P(S)-S-CH(COOC_2H_5)-S-C_2H_5$ | 300 | 113 |
| $(C_2H_5O)_2P(O)-S-CH(COOCH(CH_3)_2)-S-CH(CH_3)_2$ | 300 | 102 |
| $(C_2H_5O)_2P(O)-S-CH(COOC_2H_5)-S-C_4H_9$ | 300 | 95 |
| $(C_2H_5O)_2P(O)-S-CH(COOC_2H_5)-S-CH_2-C_6H_5$ | 300 | 97 |
| Phenyl mercuric acetate | 30 | 11 |
| Non-treated | | 210 |

EXPERIMENTAL EXAMPLE 5

Residual effectiveness against citrus red mite (Pot Test)

Test method: An emulsifiable concentrate of the compound as shown in the following Table 5 was diluted with water into the concentrations as shown in the following Table 5 and then spread on summer orange seedlings infested with citrus red mite. After spread, the number of living mites was measured and the results are shown in the following Table 5.

TABLE 5

| Active ingredient | Concentration (percent) | Number of living mites ||||||| 
|---|---|---|---|---|---|---|---|---|
| | | Before spreading | 2 days after spreading | 5 days after spreading | 7 days after spreading | 10 days after spreading | 14 days after spreading | 19 days after spreading |
| Compound in the invention: | | | | | | | | |
| $(C_2H_5O)_2P(=O)-S-CH(COOC_2H_5)-S-C_6H_5$ | 0.05 | 38 | 1 | 0 | 0 | 1 | 5 | 37 |
| $(C_2H_5O)_2P(=O)-S-CH(COOC_2H_5)-S-C_6H_4-Cl$ | 0.05 | 68 | 0 | 0 | 0 | 0 | 17 | 8 |
| $(CH_3O)_2P(=O)-S-CH(COOC_2H_5)-S-C_6H_4-Cl$ | 0.05 | 34 | 0 | 1 | 1 | 3 | 5 | 32 |
| $(C_2H_5O)_2P(=O)-S-CH(COOC_2H_5)-S-C_6H_3Cl_2$ | 0.05 | 42 | 0 | 0 | 1 | 3 | 10 | 47 |
| $(C_2H_5O)_2P(=S)-S-CH(COOC_2H_5)-S-C_6H_4-Cl$ | 0.05 | 26 | 0 | 0 | 1 | 3 | 3 | 43 |
| $(CH_3O)_2P(=S)-S-CH(COOC_2H_5)-S-C_6H_4-Cl$ | 0.05 | 61 | 1 | 1 | 0 | 5 | 14 | 32 |
| $(iso C_3H_7O)_2P(=O)-S-CH(COOC_2H_5)-S-C_6H_4-Cl$ | 0.05 | 34 | 1 | 1 | 0 | 1 | 3 | 48 |
| Comparative compounds: | | | | | | | | |
| $(CH_3O)_2P(=O)-S-CH(COOC_2H_5)-S-CH_3$ | 0.05 | 65 | 43 | 32 | 20 | 18 | 37 | 63 |
| $(CH_3O)_2P(=O)-S-CH(COOC_2H_5)-S-CH(CH_3)_2$ | 0.05 | 72 | 11 | 10 | 24 | 28 | 42 | 51 |
| $(C_2H_5O)_2P(=S)-S-CH(COOC_2H_5)-S-CH(CH_3)_2$ | 0.05 | 37 | 7 | 13 | 14 | 19 | 24 | 47 |
| $(CH_3O)_2P(=S)-S-CH(COOC_2H_5)-S-C_2H_5$ | 0.05 | 29 | 27 | 29 | 18 | 15 | 25 | 30 |
| $(CH_3O)_2P(=O)-S-CH(COOC_2H_5)-S-CH_2-C_6H_5$ | 0.05 | 103 | 52 | 62 | 35 | 38 | 19 | 56 |
| Kelthane* | 0.02 | 86 | 0 | 0 | 0 | 2 | 0 | 2 |
| Non-treated | | 33 | 64 | 55 | 51 | 107 | 47 | 32 |

* 1,1-bis(p-chlorophenyl)-2,2,2-trichloroethanol made by Rohm and Haas Co. under the trademark "Kelthane."

EXPERIMENTAL EXAMPLE 6

Effectiveness against the larvae of rice stem borer, *Chilo suppressalis* Walker.

Each liquid having the concentration of the compounds as shown in the following Table 6 was spread on rice plant, the stem of which had been encroached by stem borer 7 days ago, and the mortality was determined to obtain the result as shown in Table 6.

rice plants cultivated in a pot having a diameter of 15 cm. The rice plants were left to stand in a greenhouse. At 1, 2 and 3 days after sprayed, the thus treated rice plants were cut at the root portion, and then the cut rice plants were put into a glass bottle containing water and the leaves portion was covered with a cage and the insects to be tested were freed in the cage and after 4 hours, the mortality was determined to obtain the results as shown in Table 7.

TABLE 7

| | After sprayed | | | | | |
|---|---|---|---|---|---|---|
| | 1 day | | 2 days | | 3 days | |
| Active ingredient | Number of insects | Mortality (percent) | Number of insects | Mortality (percent) | Number of insects | Mortality (percent) |
| Compound in the invention: | | | | | | |
| A | 39 | 79.5 | 34 | 44.2 | 43 | 9.3 |
| B | 41 | 75.6 | 38 | 34.2 | 45 | 8.9 |
| C | 40 | 60.0 | 37 | 32.4 | 38 | 5.3 |
| Comparative compounds: | | | | | | |
| D | 40 | 25.0 | 43 | 0 | 34 | 0 |
| E | 38 | 29.0 | 35 | 2.8 | 32 | 0 |
| F | 36 | 27.8 | 37 | 2.7 | 37 | 0 |
| G | 42 | 16.7 | 41 | 0 | 40 | 0 |

NOTE:
A: ethyl-α-(diethoxyphosphinylthio)-α-(phenylthio)acetate.
B: ethyl-α-(dimethoxyphosphinylthio)-α-(phenylthio)acetate.
C: ethyl-α-(dimethoxyphosphinylthio)-α-(2,5-dichlorophenylthio)acetate.
D: ethyl-α-(dimethoxyphosphinylthio)-α-(methylthio)acetate.
E: ethyl-α-(dimethoxyphosphinothioylthio)-α-(isopropylthio)acetate.
F: ethyl-α-(dimethoxyphosphinylthio)-α-(ethylthio)acetate.
G: ethyl-α-(diethoxyphosphinylthio)-α-(ethylthio)acetate.

TABLE 6

| Active ingredient | Concentration (p.p.m.) | Mortality (percent) |
|---|---|---|
| Compound in the invention: | | |
| (C₂H₅O)₂P(O)–S–CH(COOC₂H₅)–S–C₆H₅ | 500 | 100 |
| (C₂H₅O)₂P(O)–S–CH(COOC₂H₄CH₃)–S–C₆H₅ | 500 | 93.3 |
| (C₂H₅O)₂P(S)–S–CH(COOC₂H₄CH₃)–S–C₆H₅ | 500 | 90.5 |
| Comparative compounds: | | |
| (CH₃O)₂P(O)–S–CH(COOC₂H₅)–S–CH₂–C₆H₅ | 500 | 60.8 |
| (CH₃O)₂P(O)–S–CH(COOC₂H₄CH₃)–S–CH₃ | 500 | 67.6 |
| (CH₃O)₂P(O)–S–CH(COOC₂H₅)–S–C₂H₅ | 500 | 12.5 |

EXPERIMENTAL EXAMPLE 7

Residual effectiveness against green rice leaf hopper.

The compounds as shown in the following Table 7 were prepared into each 20 percent emulsifiable concentrate, which was diluted with water to form a solution having a concentration of active ingredient of 0.02 percent. 50 ml of the diluted solution was sprayed on

What is claimed is:

1. An insecticidal, miticidal and fungicidal composition comprising as the active ingredient an insecticidally, miticidally and fungicidally effective amount of a compound of the formula:

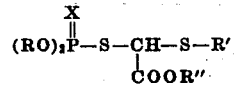

in which R is selected from the group consisting of methyl, ethyl and isopropyl, R' is selected from the group consisting of phenyl, 4-methylphenyl, 4-chlorophenyl, 2,5-dichlorophenyl, 2-nitrophenyl and 3-nitrophenyl, R'' is an alkyl having two to three carbon atoms and X is selected from the group consisting of oxygen and sulfur, and an inert carrier.

2. The composition of claim 1, wherein the compound is ethyl-α-(diethoxyphosphinylthio)-α-(phenylthio)acetate.

3. The composition of claim 1, wherein the compound is ethyl-α-(diethoxyphosphinylthio)-α-(4-chlorophenylthio)acetate.

4. The composition of claim 1, wherein the compound is ethyl-α-(dimethoxyphosphinylthio)-α-(4-chlorophenylthio)acetate.

5. The composition of claim 1, wherein the compound is ethyl-α-(diethoxyphosphinylthio)-α-(4-methylphenylthio)acetate.

6. The composition of claim 1, wherein the compound is ethyl-α-(dimethoxyphosphinylthio)-α-(4-methylphenylthio)acetate.

7. The composition of claim 1, wherein the compound is n-propyl-α-(dimethoxyphosphinylthio)-α-(phenylthio)acetate.

8. The composition of claim 1, wherein the compound is ethyl-α-(dimethoxyphosphinothioylthio)-α-(4—CHLOROPHENYLTHIO)acetate.

9. The composition of claim 1, wherein the compound is ethyl-α-(diethoxyphosphinothioylthio)-α-(4-methylphenylthio)acetate.

10. The composition of claim 1, wherein the compound is ethyl-α-(di-isopropoxyphosphinylthio)-α-(4-chlorophenylthio)acetate 11. The composition of claim 1, wherein the compound is ethyl-α-(di-isopropoxyphosphinothioylthio)-α-(4-chlorophenylthio)acetate.

12. A method of controlling and killing insects, mites and fungi which comprises applying thereto a pesticidally effective amount of a compound of the formula:

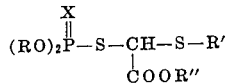

in which R is selected from the group consisting of methyl, ethyl and isopropyl, R' is selected from the group consisting of phenyl, 4-methylphenyl, 4-chlorophenyl, 2,5-dichlorophenyl, 2-nitrophenyl and 3-nitrophenyl, R'' is an alkyl having two to three carbon atoms and X is selected from the group consisting of oxygen and sulfur, in combination with an inert carrier.

* * * * *